(12) United States Patent
Aoki

(10) Patent No.: US 6,650,794 B1
(45) Date of Patent: Nov. 18, 2003

(54) DIGITAL MULTIFUNCTIONAL APPARATUS AND DATA TERMINAL APPARATUS CONNECTED THEREWITH

(75) Inventor: Isao Aoki, Utsunomiya (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 468 days.

(21) Appl. No.: 09/610,108

(22) Filed: Jul. 5, 2000

(30) Foreign Application Priority Data

Sep. 21, 1999 (JP) .......................................... 11-266575

(51) Int. Cl.[7] .............................. G06K 9/60; H04N 1/00; H04N 1/41; G06F 17/30; G06F 7/00
(52) U.S. Cl. ........................ 382/306; 382/303; 382/305; 382/307; 358/401; 358/405; 358/426.02; 707/10; 707/102
(58) Field of Search ................................. 382/112, 172, 382/180, 190, 193, 194, 195, 197, 201, 203, 204, 206, 209, 217, 218, 219, 278, 282, 303, 305, 306, 307, 317; 358/401, 403, 405, 408, 426.02, 426.06, 426.11; 707/1, 2, 3, 4, 5, 6, 10, 7, 102

(56) References Cited

U.S. PATENT DOCUMENTS 5,982,502 A  * 11/1999  Jinnai .......................... 358/296
6,005,677 A  * 12/1999  Suzuki ......................... 358/442
6,192,165 B1 *  2/2001  Irons ........................... 382/306
6,256,627 B1 *  7/2001  Beattie et al. .................. 707/6
6,330,976 B1 * 12/2001  Dymentman et al. ........ 235/487
6,335,084 B1 *  1/2002  Biegelsen et al. ........... 428/192
6,385,600 B1 *  5/2002  McGuenness et al. ......... 707/3
6,522,426 B1 *  2/2003  Park ............................ 358/1.9

FOREIGN PATENT DOCUMENTS

JP  10308868  11/1998
JP  11250075   9/1999

* cited by examiner

Primary Examiner—Bhavesh M. Mehta
Assistant Examiner—Yosef Kassa
(74) Attorney, Agent, or Firm—Greenblum & Bernstein, P.L.C.

(57) ABSTRACT

A digital multifunctional apparatus includes a printer, a scanner and a memory. A document code is stored in the memory and printed on a management document when a scanned document is stored in the memory. The document code identifies the scanned document. The apparatus comprises a receiver configured to receive data from an external data source. The memory is configured to store the data received from the external data source. A generator generates a document code that identifies the data received by the receiver. Further, a transmitter transmits the document code to the external data source to enable access by the external data source to the data in the memory identified by the document code.

20 Claims, 7 Drawing Sheets

|  | ITEM | Data1 | Data2 | Data3 | ... |
|---|---|---|---|---|---|
| MACHINE SETTING | DDcode | 11111111 | 22222222 | 33333333 | ... |
|  | MACHINE ID | 1 | 2 |  | ... |
|  | MANUFACTURER ID | 1 | 2 |  | ... |
|  | USER ID | 1 | 3 |  | ... |
|  | SIZE | A4 | B4 |  | ... |
|  | VERTICAL/ HORIZONTAL | VERTICAL |  |  | ... |
|  | SOURCE | COPY | PRINT | FAX | ... |
|  | NUMBER OF PAGES | 1 | 10 | 50 | ... |
|  | DATE | 1999/6/1 |  |  | ... |
| USER SETTING | DOCUMENT NAME | CATALOG | NOTICE FROM GENERAL AFFAIRS DEPT. | CIRCULATION | ... |

FIG. 4

DIGITAL MULTIFUNCTIONAL APPARATUS AND DATA TERMINAL APPARATUS CONNECTED THEREWITH

BACKGROUND OF THE INVENTION

1. Field of the Invention

The present invention relates to a large-capacity digital multifunctional apparatus and a data terminal apparatus connected therewith, specifically the digital multifunctional apparatus can register documents and equipped with a document managing system to control the registered documents, that registered documents is created by the data terminal apparatus and transferred to the digital multifunctional apparatus by online.

2. Description of the Related Art

In recent years, a digital multifunctional apparatus has been developed, which implements copier, printer and facsimile, etc. with a single apparatus, and furthermore a digital multifunctional apparatus incorporating a large-capacity memory to have a document managing system is also being provided.

A conventional digital multifunctional apparatus performs document managing as shown below. When a document is registered in the digital multifunctional apparatus, a scanner of the digital multifunctional apparatus scans the document sheet and stores the scanned image (herein after called document) in a predetermined area of memory. Then, the digital multifunctional apparatus creates an identification code to identify the registered document and managing information on the registered document and creates a document file for management(herein after called managing document) by combining this identification code and part of the registered document. The digital multifunctional apparatus prints the managing document. The user uses the printed managing document sheet for a search later.

Thus, the digital multifunctional apparatus allows the user to complete a document registration operation by only carrying out a scanning operation similar to a normal copy operation for a document to be registered, without requiring the user to perform special operations such as keyword entries.

When searching a desired document, the scanner of the digital multifunctional apparatus scans the managing document sheet which has been printed out when the document was registered. Then, an identification code is extracted from the scanned image of the managing document sheet and the document corresponding to the extracted identification code is searched and picked up from registered documents.

Thus, it is extremely simple to pick up the desired document; the user only needs to have the digital multifunctional apparatus scan the managing document sheet and the user need not perform any special operations such as keyword entries.

On the other hand, with the spread of data terminal apparatuses like personal computers (hereinafter referred to as "PC"), many documents are being created on a PC. When a document created on a PC is stored in memory such as a hard disk, it is often the case that a document folder is created and the document is managed as a registered document by the PC.

However, such a prior art does not allow the user to see a document registered in the digital multifunctional apparatus on a display of the PC or register a document created by the PC in the digital multifunctional apparatus. This is because the digital multifunctional apparatus carries out document management according to its own document managing system, while the PC also carries out document management according to its own document managing system, and so it is totally impossible to establish cooperation between these two. As a result, a document registered in the digital multifunctional apparatus cannot be acquired unless it is output from the recording section of the digital multifunctional apparatus, or a document created by the PC cannot be seen except on the display of the PC. This results in an inefficient system when the digital multifunctional apparatus and PC are viewed combined.

Here, adopting a separate document managing system common to the digital multifunctional apparatus and PC could solve the above problem. However, this will result in increased burden on the user because this requires the user to re-register all documents controlled according to the existing document managing system. Moreover, there are a variety of document managing systems used by digital multifunctional apparatus and PC and it is practically difficult to adopt a document management system common to all those systems.

Furthermore, since a PC has a higher-level of general purposeness than a digital multifunctional apparatus, it is possible for the PC side to adopt the document managing system of the digital multifunctional apparatus and use that system as the common system. However, compared to the PC, which is mainly based on keyboard entries, the digital multifunctional apparatus has more limited key entries and in this way it often adopts a special document managing system. Therefore, if the document managing system of the digital multifunctional apparatus is adopted to the PC, the PC is forced to follow a document managing system less convenient than its original document managing system, making the system not so easy-to-use.

SUMMARY OF THE INVENTION

The present invention has been implemented taking into account the points described above and it is an object of the present invention to provide a digital multifunctional apparatus and a data terminal apparatus connected therewith, each apparatus having its own document managing system, that allow the user to see a document registered by the digital multifunctional apparatus on the data terminal apparatus or register a document created by the data terminal apparatus in the digital multifunctional apparatus, without creating additional burden on the user or without deteriorating ease of use.

With the present invention, when a document is registered from the data terminal apparatus to the digital multifunctional apparatus, the digital multifunctional apparatus transfers a document code of a document used for document management information to the data terminal apparatus. The data terminal apparatus links the document managing information set by the user or machine with the document code of the document transferred from the digital multifunctional apparatus. When the data terminal apparatus requests the digital multifunctional apparatus to perform a document search, the data terminal apparatus converts the document managing information input by the user to a linked document code and transfers it to the digital multifunctional apparatus.

This allows the user to register a document in the digital multifunctional apparatus according to the document managing system of the digital multifunctional apparatus by simply specifying an arbitrary document name from the data terminal apparatus. Furthermore, if the user enters an arbitrary document name from the data terminal apparatus, the user can search a desired document in the digital multifunctional apparatus according to the same system as the managing system of the digital multifunctional apparatus.

A first aspect of the present invention is a digital multifunctional apparatus comprising a storage that stores one or more documents, a document managing section that, when registering a document in said storage, creates a document code of said document, outputs a managing document combining an identification mark created based on said document code with the whole or part of said document, when searching a desired document in said storage, analyzes the identification mark included in a scanned image of the managing document, extracts the desired document from said storage used by the analyzed result of the identification mark, and a controller that, when registering a document upon reception from an external data terminal apparatus, transfers a document code generated for the document to said data terminal apparatus.

According to this digital multifunctional apparatus, when receiving a document from an external data terminal apparatus connected via a network and registering the received document, the digital multifunctional apparatus transfers a document code created for the received document to the data terminal apparatus, and in this way the digital multifunctional apparatus can notify the document managing information (document code) that the digital multifunctional apparatus created according to its own document managing system to the data terminal apparatus which requested document registration. If the data terminal apparatus links the document managing information (document code) received from the digital multifunctional apparatus with the document managing information (document name set by the user, etc.) created according to the document managing system specific to the data terminal apparatus, this enables document registration from the data terminal apparatus to the digital multifunctional apparatus using the document name set by the user.

A second aspect of the present invention is a data terminal apparatus comprising a document making system that performs processing according to operator's inputs to obtain a document, a managing table that registers first document managing information to identify said created document, a first controller that, when transferring the document made by said document making system to an external digital multifunctional apparatus for registering the document, transfers said document to the digital multifunctional apparatus and acquires second document managing information created independently by said digital multifunctional apparatus, and a second controller that manages said first document managing information and said second document managing information by linking them each other.

According to this data terminal apparatus, when the document is transferred to the external digital multifunctional apparatus and registered, the data terminal apparatus acquires the second document managing information (document code) created by the digital multifunctional apparatus and manages the first document managing information (document name set by the user, etc.) created according to the managing system of the data terminal apparatus and the second document managing information created according to the managing system of the digital multifunctional apparatus by linking them each other, enabling document registration from the data terminal apparatus to the digital multifunctional apparatus using the document name set by the user.

A third aspect of the present invention is a digital multifunctional apparatus comprising a storage that stores one or more documents, a document managing section that creates, when registering a document, a document code of the document to be registered, outputs a managing document combining an identification mark created based on the document code with the whole or part of the document, and when searching desired document, scans the managing document and analyzes the identification mark included in the scanned image of the managing document and extracts the corresponding document from the storage, and a control section that transfers, when receiving and registering a document from an external data terminal apparatus, a document code created for the document to the data terminal apparatus and receives, when searching a document at the request of the external data terminal apparatus, the same document code as the document code created by the document managing section from the data terminal apparatus and searches the desired document based on this document code.

According to this digital multifunctional apparatus, when searching a registered document at the request of the external data terminal apparatus, the digital multifunctional apparatus receives the same document code as the document code created by the document managing section from the data terminal apparatus, and in this way can search the document according to the document managing system of the digital multifunctional apparatus.

A fourth aspect of the present invention is a data terminal apparatus comprising a document making system that performs processing according to operator's inputs to obtain a document, a managing table that registers first document managing information to identify said created document, a first controller that, when transferring the document made by said document making system to an external digital multifunctional apparatus for registering the document, transfers said document to the digital multifunctional apparatus and acquires second document managing information created independently by said digital multifunctional apparatus, and a second controller that manages said first document managing information and said second document managing information by linking them each other, and a control section that, when searching a document registered in the digital multifunctional apparatus, receives the first document managing information corresponding to a desired document from the user, searches the corresponding second document managing information from the control table and transfers the corresponding second document managing information to the digital multifunctional apparatus.

According to this data terminal apparatus, when the user searches a registered document in the digital multifunctional apparatus from the data terminal apparatus via a network, if the user specifies a desired document using the first document managing information named by the user or the first document managing information named by the data terminal apparatus, instead of the second document managing information named by the digital multifunctional apparatus on the data terminal apparatus, the data terminal apparatus automatically searches the second document managing information corresponding to this first document managing information and sends the second document managing information to the digital multifunctional apparatus, and in this way only the second document managing information is exchanged between the data terminal apparatus and the digital multifunctional apparatus, allowing the digital multifunctional apparatus to search a desired document based on the second document managing information added by itself.

Thus, when searching a registered document in the digital multifunctional apparatus from the data terminal apparatus, if the user specifies a desired document based on the first document managing information named by the user on the data terminal apparatus or named by the data terminal apparatus, then the user can search the desired document in the digital multifunctional apparatus without knowing the second document managing information.

In addition, the present invention of this aspect can minimize the amount of information communication of the document managing information when searching a registered document in the digital multifunctional apparatus from the data terminal apparatus, thus improving the system efficiency. Moreover, the user can freely enter keywords such as a document name on the data terminal apparatus regardless of the managing system of the multifunctional apparatus in which the document is registered and without constraints of restrictions on key entries of the digital multifunctional apparatus, facilitating user convenience.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 4 illustrates a configuration of a managing information table;

DETAILED DESCRIPTION OF THE PREFERRED EMBODIMENTS

With reference now to the attached drawings, an embodiment of the present invention is explained in detail below.

Figure 1:
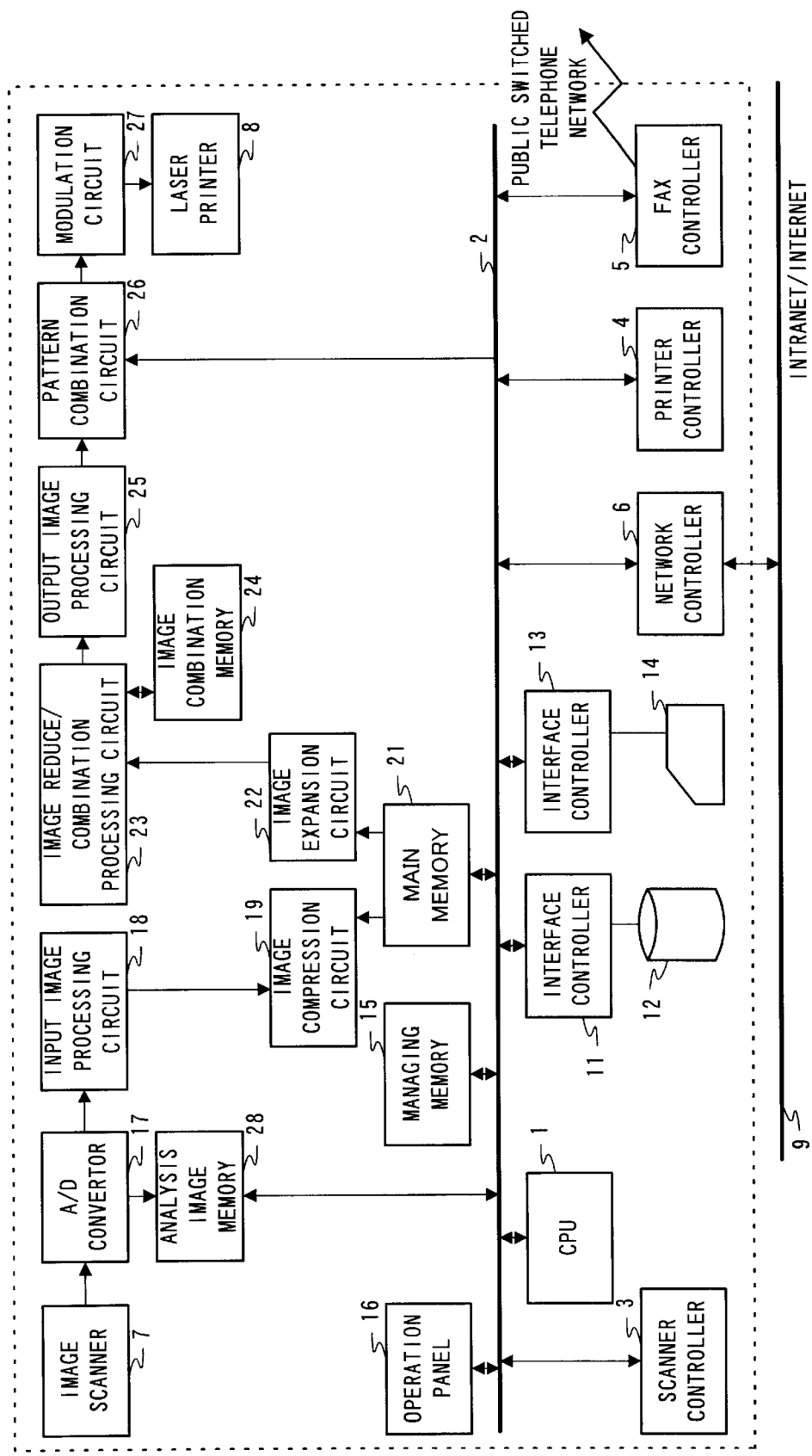
FIG. 1 is a block diagram of a digital multifunctional apparatus according to an embodiment of the present invention.
Figure 2:
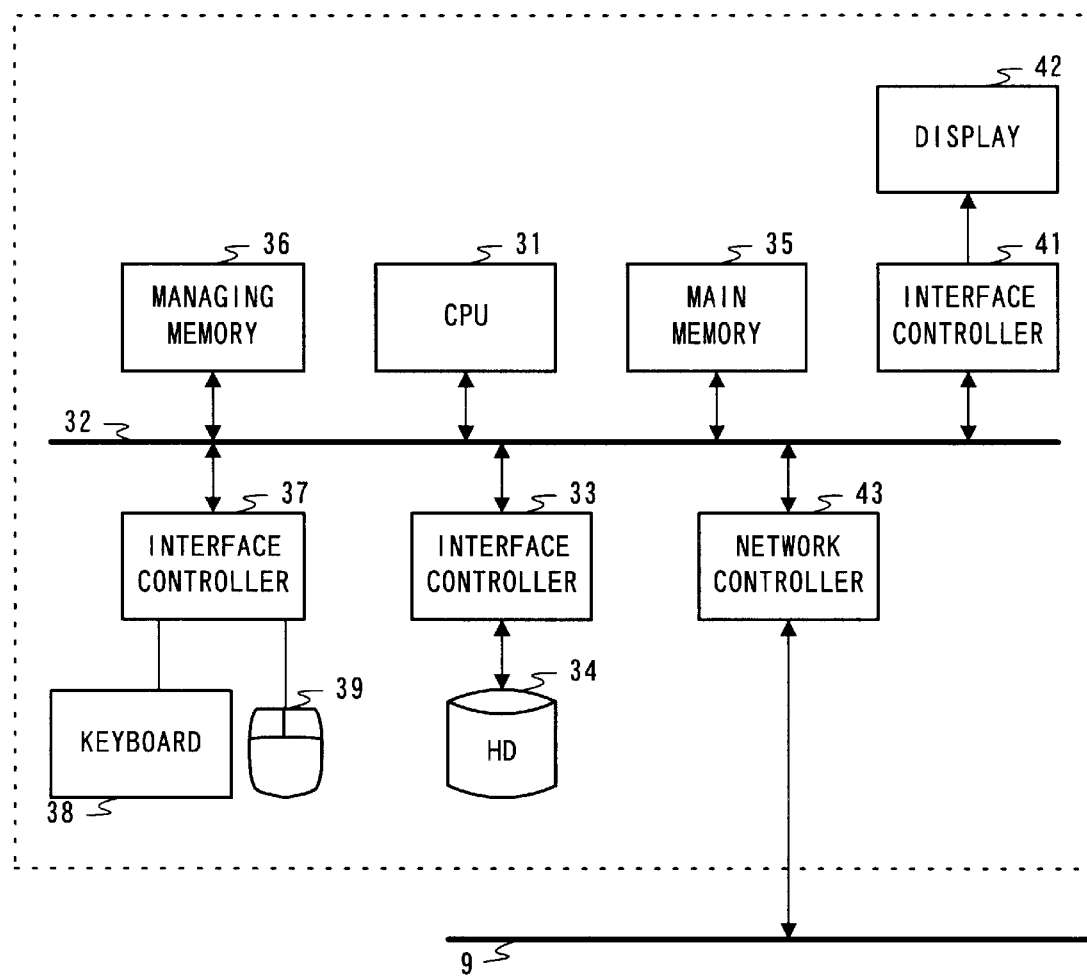
FIG. 2 is a block diagram of a data terminal apparatus according to the embodiment of the present invention.

FIG. 1 is a functional block diagram of a digital multifunctional apparatus according to an embodiment of the present invention and FIG. 2 is a functional block diagram of a PC serving as a data terminal apparatus connected to this digital multifunctional apparatus.

In the digital multifunctional apparatus shown in FIG. 1, CPU 1 is connected, via internal bus 2, to scanner controller 3, printer controller 4, FAX controller 5 and network controller 6. Scanner controller 3 controls operation of image scanner section 7 and printer controller 4 controls operation of laser printer 8. FAX controller 5 controls facsimile communication that transmits/receives facsimile data and network controller 6 controls data exchange between this multifunctional apparatus (CPU 1) and network 9.

The digital multifunctional apparatus above is connected, via interface controller 11, to large capacity storage device 12. Storage device 12 stores documents and has a large storage capacity enough to store many documents. The digital multifunctional apparatus above can also be connected to removable storage medium 14 via another interface controller 13. It is also possible to store documents in storage medium 14. The following is an explanation of a case where a document is registered in storage device 12.

Managing information and document code of a registered document stored in storage device 12 are stored in managing memory 15. The managing information of the registered document includes a document ID, document size information, date of creation and other information added when the document is registered. The document code of the registered document includes of a combination of the document ID and other information (for example, apparatus ID, user ID and manufacturer ID added to the digital multifunctional apparatus). The document code is converted to an identification mark made up of a specific pattern image. It is desirable that the apparatus ID, user ID and manufacturer ID be stored in a predetermined area of managing memory 15.

When a document is registered in the above digital multifunctional apparatus, a document registration mode is selected. A command from the user to the digital multifunctional apparatus is input from operation panel 16. If the document registration mode is selected, an image scanned by image scanner section 7 is stored in storage device 12 and subjected to document registration. To do this, an analog image signal output from image scanner section 7 is converted to a digital image by A/D convertor 17, subjected to image processing to improve the image quality by input image processing circuit 18, converted to a compressed image by image compression circuit 19 and written to main memory 21. CPU 1 stores the compressed image written to main memory 21 in storage device 12 as a document to be registered.

On the other hand, a managing document is created to search the registered document later. That is, a unique document ID is given to the registered document and then a document code is created by combining the document ID, apparatus ID, user ID and manufacturer ID stored in managing memory 15. This document code is converted to a pattern image that will become an identification mark. Then, the pattern image above is pasted to a predetermined location of a page that is a first page or a page into which a plurality of pages of the registered document is compressed and combined. If the pattern image is formed on the first page of the registered document, the compressed images of the corresponding pages from storage device 12 or storage medium 14 are developed on main memory 21. Or the compressed images of the corresponding pages are copied and read from main memory 21 before document registration. The compressed images of the corresponding pages are expanded by image expansion circuit 22, passed through image reduce/combination circuit 23 and subjected to image processing to match the output format by output image processing circuit 25. Then, the images are input to pattern combination circuit 26. Pattern combination circuit 26 is given from CPU 1 bit map data of the pattern image created by CPU 1 at the time of document registration, which will become an identification mark. Pattern combination circuit 26 creates a managing document with an identification mark superimposed in a predetermined position of the first page image of the registered document. The managing document is analog-modulated to a laser signal by modulation circuit 27 and printed by laser printer 8.

If a plurality of pages of the registered document is compressed and combined into a single page, the compressed images of the corresponding pages are expanded by image expansion circuit 22 via main memory 21 likewise. The expanded images are reduced image size by image reduce/combination circuit 23, written at a predetermined address of image combination memory 24 and in this way an image is created with a plurality of pages reduced and combined into a single page. This image is subjected to image processing to match the output format by output image processing circuit 25, then input to pattern combination circuit 26. Pattern combination circuit 26 creates a managing document with an identification mark combined in a predetermined position of the image above. This managing document is analog-modulated to a laser signal by modulation circuit 27 and printed by laser printer 8.

In this way, a managing document is created composed of part or the whole of the registered document and an identification mark. It is also possible to add a numeric string of the document code side of the identification mark.

When a registered document is read using the above managing document, a document search mode is selected by the user operating operation panel 16. If the document search mode is selected, the image of the managing document scanned by scanner 7 is stored in analysis image memory 28. CPU 1 extracts the identification mark of the managing document from the image information stored in analysis image memory 28, analyzes the identification mark and recognizes a document code. CPU 1 searches and extracts the registered document with the recognized document code from storage device 12 or storage medium 14. The extracted document is passed through image reduce/combination processing circuit 23 and pattern combination circuit 26 without being subjected to processing and output from laser printer 8.

If the searched document is output to a network or facsimile, the searched document is output to network controller 6 or FAX controller 5 and transferred to the final destination.

On the other hand, the PC shown in FIG. 2 assumes a configuration of a general PC except a document registration function and search function that will be described later. More specifically, CPU 31 operates under an operating system and can download an application program from hard disk 34 via interface controller 33 connected via internal bus 32 to main memory 35 and execute the application program. This application program executed by CPU 31 can be document creation software, application software to register a created document in the digital multifunctional apparatus or browser software that searches and extracts a document registered in the digital multifunctional apparatus, etc.

Managing memory 36 registers a managing information table that links a document name that the user puts arbitrarily when creating the document with a document code used by the digital multifunctional apparatus for document managing. The document code is the information sent from the digital multifunctional apparatus when the PC registers the document in the digital multifunctional apparatus.

A user command for CPU 31 of the PC is input from keyboard 38 or pointing device 39, etc. via interface controller 37. The PC is also connected to display 42 via interface controller 41. A document being created or document being browsed is displayed on display 42. Furthermore, data exchange between CPU 31 of the PC and a network is controlled by network controller 43.

Next, the operation of registering a document created by the PC in the digital multifunctional apparatus via network 9 is explained.

Figure 3:
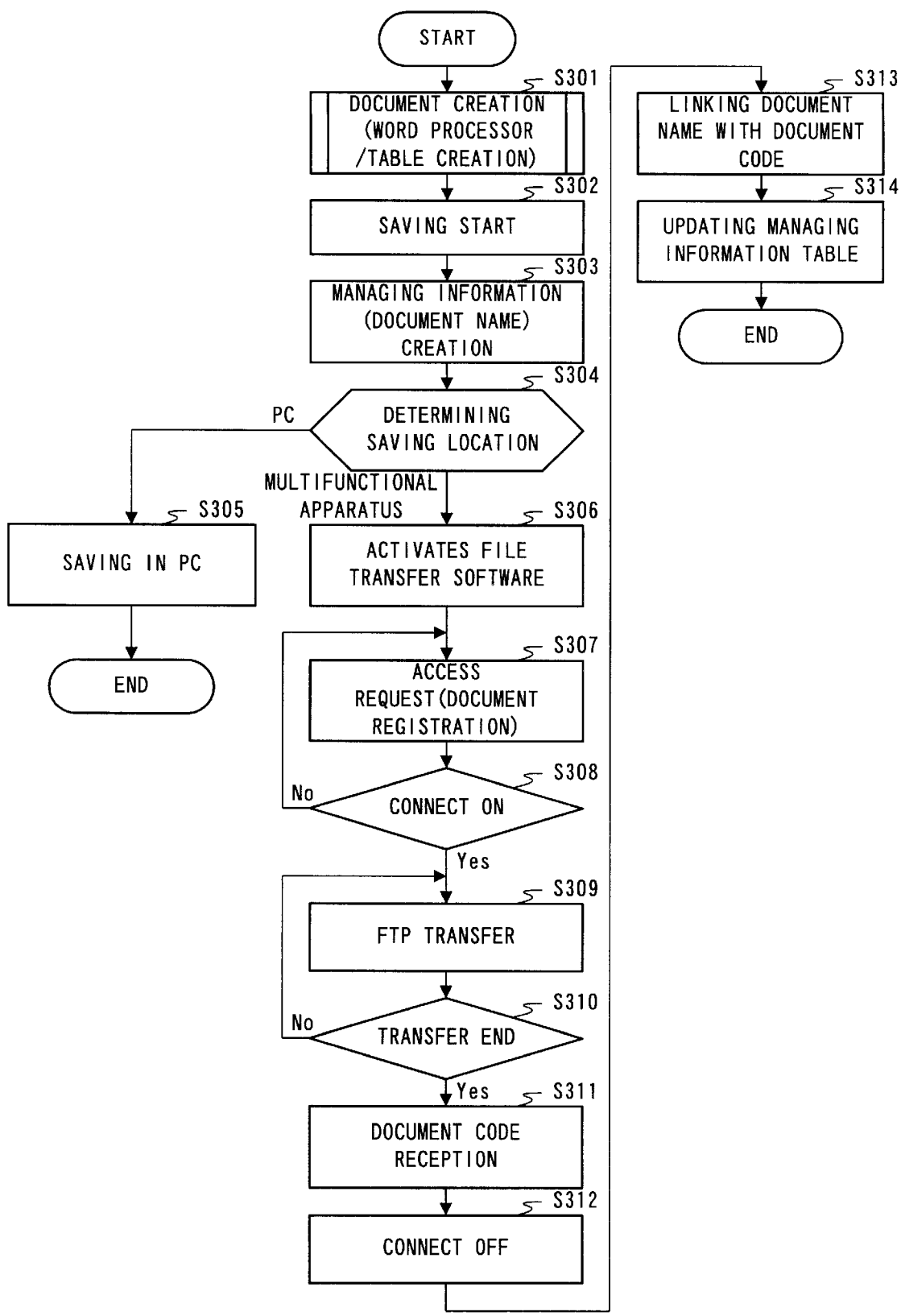
FIG. 3 is a document registration flow chart of the data terminal apparatus according to the embodiment of the present invention.

FIG. 3 is a flow chart for document registration by the PC. Document creation software is started, then a document such as a text document or table is created (step S301) and saving of the created document according to entries from the user (step S302). When the user enters the name of a document to be saved, the "document name" is registered in a user setting area of the managing information table that controls saved documents (step S303). At this time, aside from the user setting, the machine registers additional information such as date, number of pages, size, machine ID, manufacturer ID and user ID, etc. in the managing information table. FIG. 4 shows a specific example of the managing information table. "DDcode" at the top area of the table is the document code notified from the digital multifunctional apparatus.

Then, it is determined whether the created document should be saved in the PC or digital multifunctional apparatus (step S304). Since the user specifies where to save the document, it is determined whether the document is saved in the PC or digital multifunctional apparatus. If the document is saved in the PC, the name of a folder in which the document is saved is determined and stored (step S305).

On the other hand, if the digital multifunctional apparatus is specified as the place to save the document, file transfer software is started (step S306) and an access request for document registration is sent (step S307). This is done by accessing the digital multifunctional apparatus from network controller 43 of the PC via network 9 requesting document registration.

Upon reception of the request for document registration from the PC, the digital multifunctional apparatus returns a response acknowledging the access and a connection between the two is established when the PC receives the access acknowledgment response (step S308)

Once the connection is established, the created document to be registered, which is temporarily saved in main memory 35 of the PC, is file-transferred from the PC to the digital multifunctional apparatus according to an FTP(file transfer protocol) (step S309).

When the document transfer from the PC to the digital multifunctional apparatus is completed (step S310), the PC waits for a document code to be sent from the digital multifunctional apparatus. As described above, the digital multifunctional apparatus creates a document code to generate an identification mark specific to the document according to its own managing system when registering the document. When registering the document whose registration is requested by the PC, the digital multifunctional apparatus also creates a document code in the same way and sends the document code to the PC, which requested the document code.

When the document code of the registered document is received from the digital multifunctional apparatus (step S311), the connection established with the PC is cancelled (step S312). Then, the managing information table saved in the PC managing memory 36 is written to main memory 35 and on main memory 35 the document name and the document code (DDcode) of the registered document in the managing information table are linked. The managing information table in FIG. 4 shows a state in which the document name set by the user when the document is saved and document code (DDcode) created by the digital multifunctional apparatus when the document is registered are linked. In this way, the managing information table is updated by returning the managing information table in which the document name and document code are linked to managing memory 36 (step S314).

Figure 5:
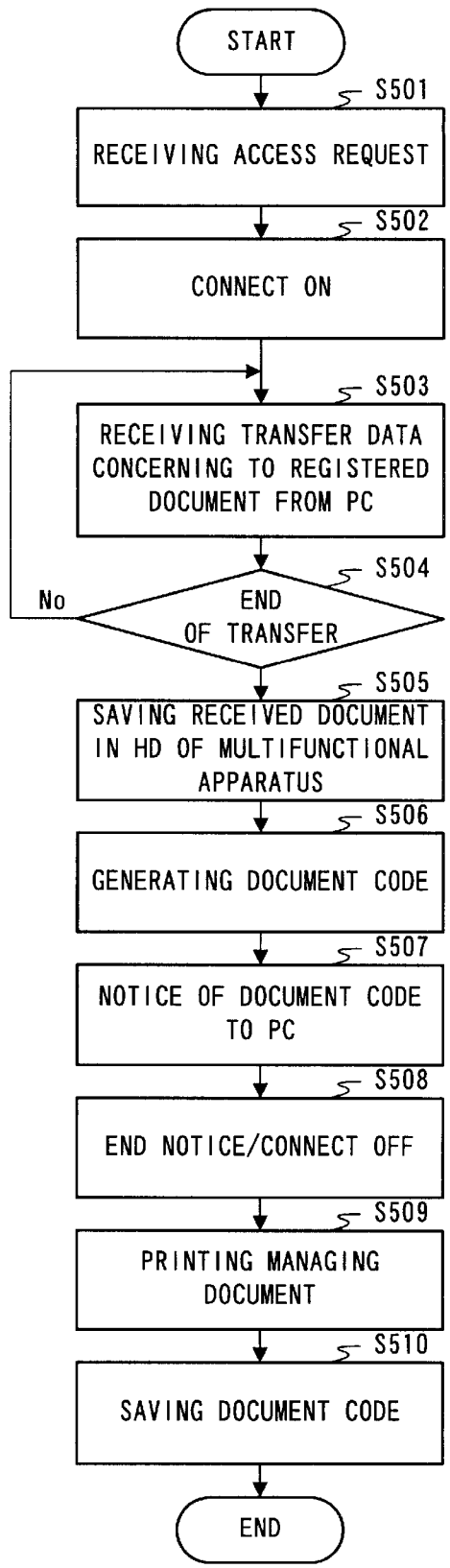
FIG. 5 is a document registration flow chart of the digital multifunctional apparatus according to the embodiment of the present invention.

FIG. 5 is a flow chart when the digital multifunctional apparatus registers a document at the request of the PC for document registration. Upon reception of an access request from the PC via network 9 (step S501), the digital multifunctional apparatus returns a response acknowledging the access and establishes a connection with the PC (step S502). Then, document data transferred from the PC according to the FTP is received (step S503). The document data received is temporarily stored in main memory 21 of the digital multifunctional apparatus.

When the transfer of the document data is completed (step S504), the received document data saved in main memory 21 is stored in storage device 12 (step S505). When the received document data is stored in storage device 12, a document ID is given according to the managing system of the digital multifunctional apparatus and a document code is created by combining the document ID, apparatus ID, manufacturer ID and user ID (step S506)

The digital multifunctional apparatus notifies the document code of the registered document requested for registration by the PC to the PC via network 9 (step S507). When the document code is sent to the PC, a notice of termination is sent to the PC and the connection with the PC is canceled (step S508).

Then, a managing document made up of a plurality of pages of the registered document received from the PC and registered and an identification mark having the document code is created in the same way as described above and printed (step S509). Printing of the managing document may also be prevented by so setting in the digital multifunctional apparatus. This is because when the document is registered from the PC, if the user is far from the digital multifunctional apparatus, it may be difficult to take the printed managing document to the user.

Finally, the control code of the registered document is stored in the managing information table of managing memory 15 of the digital multifunctional apparatus (step S510).

In this way, a document created by the PC can be registered in the digital multifunctional apparatus. Then, the operation when a document registered in the digital multifunctional apparatus from the PC is searched is explained.

Figure 6:
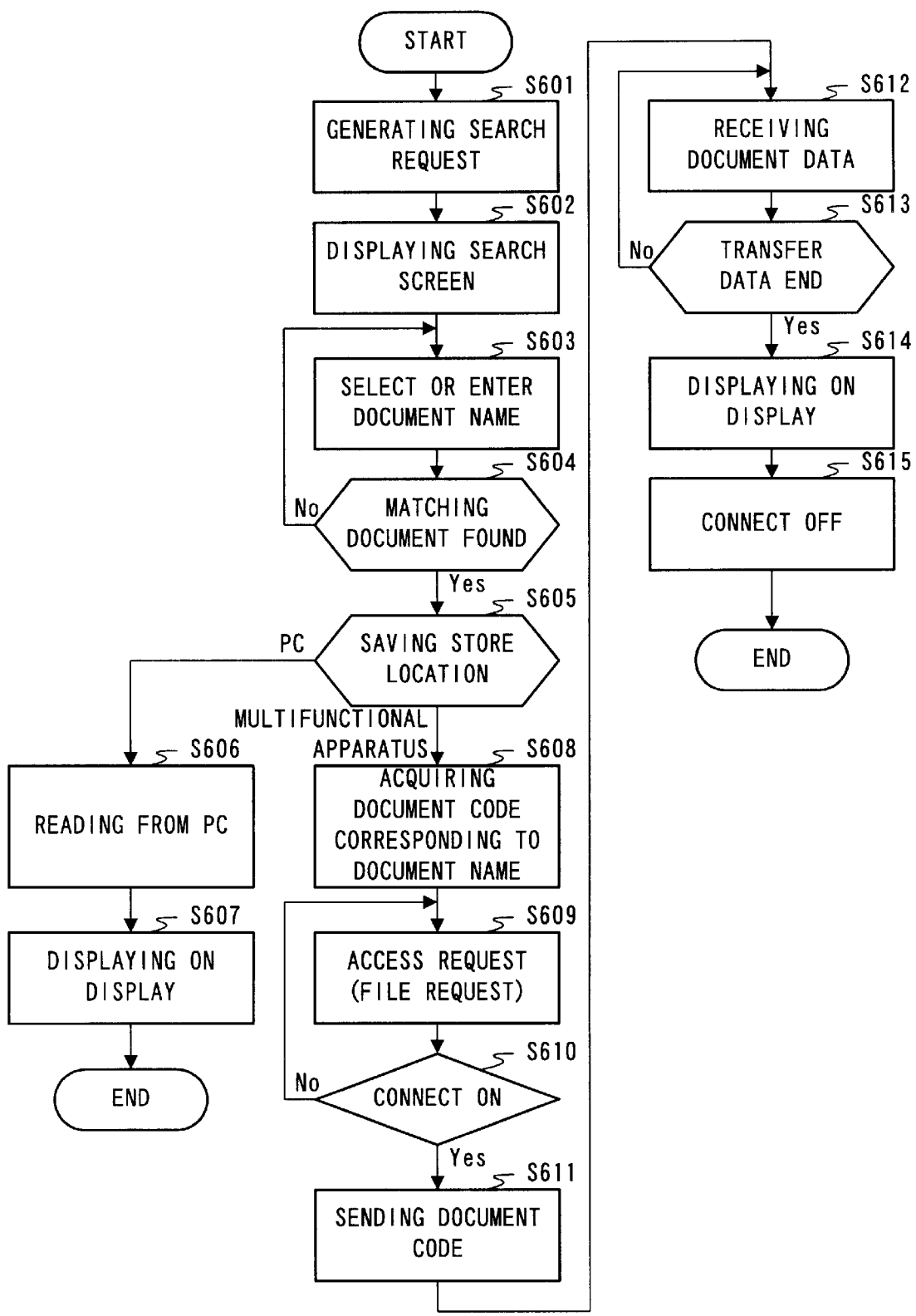
FIG. 6 is another document registration flow chart of the data terminal apparatus according to the embodiment of the present invention.

FIG. 6 is a flow chart for searching a document registered in the digital multifunctional apparatus from the PC. When a search request is generated on the browser software (step S601), a search screen is displayed (step S602). When the name of a document to be searched is input to the search screen or selected from a list, the name of the document to be searched is confirmed (step S603). Here the document name is the one the user entered when the above document was saved.

When the search document name is confirmed, the corresponding document name is searched from the managing information table of managing memory 36 of the PC (step S604). The document name saved in the PC and the document name transferred from the PC to the digital multifunctional apparatus and registered are registered in the managing information table. If no corresponding document name is found in the managing information table, there is a possibility that the user has entered a wrong document name, and so the user is prompted to enter or select another document name (step S604).

If the corresponding document name is found in step S604, the place where the searched document is saved is determined (step S605). If the document is saved in hard disk 34 of the PC, the document is saved and managed according to the managing system of the PC, and so the document can be extracted using the document name used when the document was saved in the PC (step S606). The document extracted using the document name is displayed on display 42 (step S607).

On the other hand, if the document is saved in the digital multifunctional apparatus in step S605, a document code linked with the document name is acquired (step S608). A document code is given according to the managing system of the digital multifunctional apparatus completely independent of the managing system of the PC and the user is not aware of the document code. CPU 31 acquires the document code linked with the document name from the managing information table saved in managing memory 36 of the PC. Therefore, the PC can acquire the document code even if the PC user does not know the document code given according to the managing system of the digital multifunctional apparatus at all.

Once the document code of the desired document is acquired, an access request for the desired document is sent to the digital multifunctional apparatus via network 9 (step S609) and if the digital multifunctional apparatus sends a response acknowledging the access, a connection with the digital multifunctional apparatus is established (step S610). Then, if the connection is established (CONNECT ON), the previously acquired document code is sent to the digital multifunctional apparatus requesting the file of the corresponding document (step S611).

In response to the file request in step S611, the digital multifunctional apparatus sends the desired document to be searched and the document data is received (step S612). Since this document code created according to the document managing system of the digital multifunctional apparatus is sent from the PC, the digital multifunctional apparatus can search the document using the received document code. The searched document is FTP-transferred to the PC.

The PC receives the document data transferred from the digital multifunctional apparatus and when the data transfer ends (step S613), the PC has display 42 show the received document (step S614). Then, the PC cancels the connection with the digital multifunctional apparatus (step S615).

As shown above, if the user specifies an arbitrary document name and instructs a document search, the document name is converted to a document code linked with the document name in the managing information table and a search request is sent from the data terminal apparatus to the digital multifunctional apparatus and at the same time the search result is sent from the digital multifunctional apparatus to the PC and displayed on the display.

Figure 7:
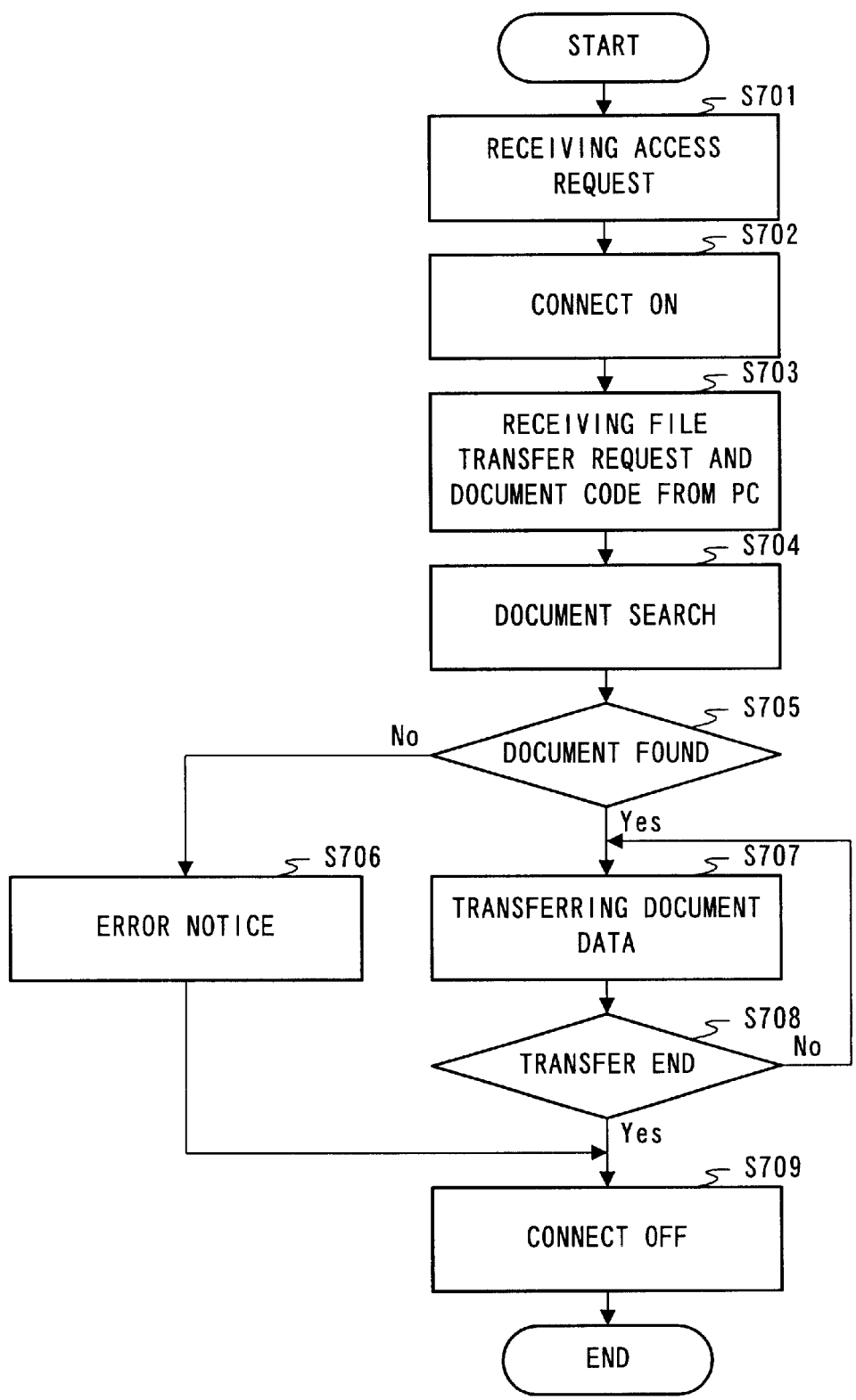
FIG. 7 is another document registration flow chart of the digital multifunctional apparatus according to the embodiment of the present invention.

FIG. 7 is a flow chart for searching a document in the digital multifunctional apparatus, which receives a request for a document search from the PC. Upon reception of an access request for a document search from the PC via network 9 (step S701), the digital multifunctional apparatus sends a response acknowledging the access to the PC and establishes a connection with the PC (step S702).

When the connection with the PC is established (CONNECT ON), a document code of the document to be searched is sent from the PC and the digital multifunctional apparatus receives this document code (step S703). The digital multifunctional apparatus controls document codes and storage addresses of all registered documents in managing memory 15. CPU 1 searches the document code that matches the document code of the document being searched from managing memory 15 (step S704). If no corresponding document code is found (step S705), an error notice is sent to the PC that requested the document search (step S706).

If the corresponding document code is found in step S705, the digital multifunctional apparatus extracts the corresponding document from storage device 12 and file-transfers it to the PC according to the FTP (step S708). When the transfer of the entire document data is completed, the connection with the PC is canceled (step S709).

As shown above, when the document created by the PC is registered in the digital multifunctional apparatus, first document managing information of the date, document name, etc. is created on the PC, the document to be registered is transferred to the digital multifunctional apparatus, and on the other hand, the digital multifunctional apparatus registers the document and creates second document managing information of the document code, etc. for the digital multifunctional apparatus, manages registered documents using the second document managing information, sends the second document managing information to the PC. The PC manages the first document managing information and the second document managing information by linking these two. When the PC searches a registered document in the digital multifunctional apparatus, if the PC specifies a desired document based on the document managing information added by the user or the document managing information automatically added by the PC, the PC can search the second document managing information controlled linked with the first document managing information and specify a desired document in the digital multifunctional apparatus based on this, and so the user can identify the desired document if the user only knows the first document managing information on the PC without knowing the second document managing information added by the digital multifunctional apparatus. Thus, it is possible to freely enter keywords such as a document name regardless of the document managing system of the digital multifunctional apparatus that registers documents, making it possible to improve the efficiency and convenience of the entire system.

Furthermore, it is possible to minimize the amount of information communication of the document managing information when searching registered documents in the digital multifunctional apparatus from the PC, improving the system efficiency. Moreover, the user can freely enter keywords such as a document name on the PC irrespective of the managing system of the digital multifunctional apparatus that registers documents without being constrained by the restrictions on key entries by the digital multifunctional apparatus, thus facilitating user convenience.

The present invention is not limited to the above described embodiments, and various variations and modifications may be possible without departing from the scope of the present invention.

This application is based on the Japanese Patent Application No. HEI11-266575 filed on Sep. 21, 1999, entire content of which is expressly incorporated by reference herein.

What is claimed is:

1. A digital multifunctional apparatus comprising:
   a scanner that scans a document image;
   a communicator that communicates with a client through a communication network;
   a storage that stores at least one document;
   a document registrator that stores a document image scanned by said scanner and data received by said communicator in said storage as a registered document, creates a document code and managing information, said document code comprising a unique code for the registered document, said managing information including a storage address of the registered document associated with the document code;
   a notifier that, when said registered document is requested by a signal from the client, transfers the document code of said registered document to said communicator so that the document code is sent to the client via the communication network;
   an outputter that creates an identification mark indicating said document code and outputs a managing document combining said identification mark and at least part of said registered document; and
   a document searcher configured to search for a document in said storage, said searcher configured to analyze the identification mark included in a scanned image of the managing document scanned by said scanner to recognize the document code to acquire the storage address corresponding to the recognized document code from said managing information and to extract the document from the acquired storage address.

2. The digital multifunctional apparatus according to claim 1, wherein said document registrator stores the document to be registered in said storage in response to receipt of a request from the client, via a network, for document registration.

3. The digital multifunctional apparatus according to claim 1, wherein said document searcher searches for a desired document in response to a request from the client, said document searcher receives a document code of the desired document from the client via a network and detects a document code matching the received document code from said managing information.

4. The digital multifunctional apparatus according to claim 1, wherein the client manages at least one document under a document managing system which is different from a document managing system of said digital multifunctional apparatus.

5. The digital multifunctional apparatus according to claim 1, wherein said document code is configured as a combination of a document ID and other information.

6. The digital multifunctional apparatus according to claim 1, wherein said other information includes at least one of an apparatus ID of the digital multifunctional apparatus, user ID and manufacturer ID.

7. The digital multifunctional apparatus according to claim 1, further comprising:
   an operation panel configured to input a registration instruction to said document registrator, a search instruction to said document searcher, and other predetermined instructions;
   a facsimile section that transmits/receives images via a telephone line; and
   a printer that is configured to print a registered document, said managing document, an image scanned by said scanner and an image received by said facsimile section.

8. A computer including a display and an input device, comprising:
   a recording medium that stores programs;
   a processor that reads a program stored in said recording medium and performs a processing according to the program;
   a memory in which data generated by said processor is stored; and
   a communicator that communicates with a digital multifunctional apparatus via a network,
      wherein said recording medium stores a first program which is executable to obtain a document and a second program which is executable to transfer a document,
      said first program instructing said processor to create a document in accordance with a signal input by said input device, to display the document on said display, and to create managing information including the document name, input from said input device, and a storage location in said memory when the document is stored at the storage location, said second program, upon receipt of an instruction from said input device that the document should be stored in said digital multifunctional apparatus, instructs said processor to transfer the document from said memory via said communicator to said digital multifunctional apparatus and, when said communicator receives a document code from said digital multifunctional apparatus, links said document code with the document name in said managing information.

9. The computer according to claim 8, wherein said recording medium further stores a third program that searches for a document, said third program, when instructed by said input device to search for a document with a designated document name, instructs said processor to search the storage location of the designated document corresponding to said document name in said managing information, to extract the document code corresponding to said document name, to request transfer of the document associated with said document code by said communicator from said digital multifunctional apparatus when the storage location is in said digital multifunctional apparatus, and to receive the requested document from said digital multifunctional apparatus.

10. A digital multifunctional apparatus including a printer, a scanner and a memory, wherein a document code is stored in the memory and printed on a management document when a scanned document is stored in the memory, the document code identifying the scanned document, the digital multifunctional apparatus comprising:

a receiver configured to receive data from an external data source;

the memory configured to store data received from the external data source;

a generator that generates a document code that identifies the data received by said receiver; and a transmitter configured to transmit the document code to the external data source to enable access, by the external data source, to the data in the memory identified by the document code.

11. The digital multifunctional apparatus according to claim 10, wherein said transmitter transmits the document code into a table provided in the external data source, the table storing a listing of document codes and corresponding file names.

12. The digital multifunctional apparatus according to claim 10, wherein the external data source comprises a personal computer connected to the digital multifunctional apparatus by a network.

13. The digital multifunctional apparatus according to claim 10, further comprising a retriever that, when a document code is received from the external data source, retrieves data stored in said memory of the multifunctional apparatus by using the document code received from the external data source.

14. The digital multifunctional apparatus according to claim 10, wherein the data stored in the memory is accessible from the external data source by input of a file name, whereby data is accessed using document code associated with the input file name.

15. A data terminal apparatus connected to a digital multifunctional apparatus, the digital multifunctional apparatus printing a document code on a management document when a scanned document is stored in memory, the document code identifying the scanned document, the data terminal apparatus comprising:

a generator that generates a file name corresponding to created data;

a transmitter configured to transmit the data to the digital multifunctional apparatus to store the data into the memory of the digital multifunctional apparatus;

a receiver configured to receive a document code corresponding to the transmitted data from the digital multifunctional apparatus, the document code being utilized to manage the transmitted data in the digital multifunctional apparatus; and a table that stores the document code received by said receiver, corresponding to the generated file name, the data corresponding to the file name being accessible from the digital multifunctional apparatus by use of the document code.

16. The data terminal apparatus according to claim 15, further comprising a searcher that, when a file name corresponding to a desired data stored in the digital multifunctional apparatus is input, searches for a document code corresponding to the input file name in said table, and transfers the searched document code to the digital multifunctional apparatus to enable retrieving of the desired data.

17. A method for storing data into a memory of a digital multifunctional apparatus including a memory, a printer and a scanner, wherein a document code is stored in the memory and printed on a management document when a scanned document is stored in the memory, the document code identifying the scanned document, the method comprising:

receiving the data from an external data source;

storing the data received from the external data source;

generating a document code that identifies the stored data; and transmitting the document code to the external data source to enable access by the external data source to the stored data identified by the document code.

18. The method according to claim 17, further comprising retrieving, when a document code is received from the external data source, stored data by using the document code transmitted from the external data source.

19. A method for storing data, using a terminal apparatus connected to a digital multifunctional apparatus, the digital multifunctional apparatus printing a document code on a management document when a scanned document is stored in memory, the document code identifying the scanned document, the method comprising:

generating a file name corresponding to created data;

transmitting the data to the digital multifunctional apparatus to store the data into the memory of the digital multifunctional apparatus;

receiving a document code corresponding to the transmitted data from the digital multifunctional apparatus, the document code being utilized to manage the transmitted data in the digital multifunctional apparatus; and storing the received document code corresponding to the generated file name into a table, the data corresponding to the file name being accessible from the digital multifunctional apparatus by use of the document code.

20. The method according to claim 19, further comprising:

searching a document code corresponding to the input file name from the table when a file name corresponding to a desired data stored in the digital multifunctional apparatus is input; and transferring the searched document code to the digital multifunctional apparatus to retrieve the desired data.

* * * * *